(No Model.)
R. W. TRAYLOR.
JOURNAL BOX AND BEARING.
No. 291,243.   Patented Jan. 1, 1884.
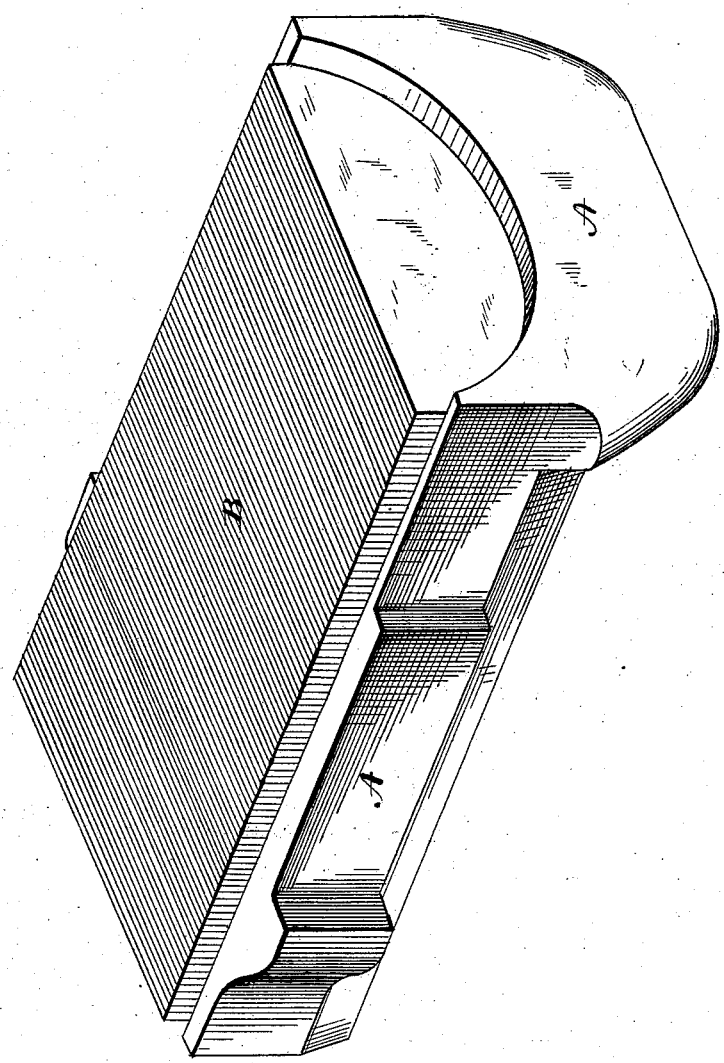
WITNESSES
F. L. Ourand
Chas. J. Williamson,
INVENTOR
Robert W Traylor
Attorney

UNITED STATES PATENT OFFICE.

ROBERT W. TRAYLOR, OF RICHMOND, VIRGINIA, ASSIGNOR TO THE JOURNAL BEARING MICA COMPANY, OF NEW YORK, N. Y.

JOURNAL BOX AND BEARING.

SPECIFICATION forming part of Letters Patent No. 291,243, dated January 1, 1884.

Application filed June 25, 1883. (No model.)

*To all whom it may concern:*

Be it known that I, ROBERT W. TRAYLOR, a citizen of the United States, residing at Richmond, Henrico county, Virginia, have invented new and useful Improvements in Journal Bearings and Boxes, of which the following is a specification.

The object of my invention is to provide new and improved composition boxes or bearings for journals, axles, shafts, and other purposes, which will possess the inherent characteristics of lubricating the axle or shaft and at the same time decreasing friction and avoiding heating of the box or bearing and axle or shaft. This object I accomplish by forming, placing, or cutting the mica in any desired shape and securing the same closely together with a suitable clamp. I then place the clamp and mica in a suitable mold, and cast iron or brass or any other suitable metal around the mica, thus forming a solid and compact mass of mica with a metallic casing or frame around the mica, except at one side. The metallic casing or frame thus formed more closely and firmly binds and holds compact mica than can otherwise be done, and the shrinkage of the metal binds and compresses the mica still more closely together. After removing the bearing from the mold, I take off the clamp and put the bearing in any suitable machine and concave the mica side to receive the journal, axle, or shaft. Thus I make a more firm and compact bearing than has heretofore been made of mica. In concaving the mica side, I leave the mica even with or slightly above the metallic casing or frame. A metallic casing, B, shows the mica.

The drawing shows a perspective view of a journal-bearing made according to my invention as it appears when I have removed the clamp and before I concave the mica side.

In the accompanying drawing I show a journal of ordinary shape; but I do not limit myself to any particular form of box or bearing, as such can be of any shape desired or found necessary. Nor do I limit myself to shaping or cutting the sides of the mica which are to be incased in the metallic frame into any particular shape, as such can be of any shape suitable for the box or bearing. The box or bearing may be of any suitable or known form, and in making the same I proceed as above stated.

I have found that a box or bearing of the character set forth will act as a non-conductor, and hence it decreases the liability of the box or bearing becoming heated. It possesses very efficient lubricating qualities, and hence reduces friction, and it is light but sufficiently substantial for the purposes intended.

I sometimes add plumbago to the mica before placing or securing the same in the mold. This improves the bearing for light machinery; but I do not confine myself to the plumbago, as I can add any suitable lubricator with it before casting the shell or frame around it.

I have found that these bearings give more satisfactory results than can be accomplished by casting, molding, pressing, or forcing into and upon a cold metallic frame or casing.

What I claim is—

1. The method herein described of making journal boxes or bearings by casting or molding a metallic shell or casing around a compact mass of mica cut or placed into any desired shape or form, substantially as described.

2. A journal box or bearing composed of mica, with a suitable metallic frame or casing cast or molded around it, except on the side for the journal, substantially as described.

3. A journal box or bearing composed of mica combined with plumbago or other suitable substance, with a suitable metallic frame or casing cast or molded around it, except on the side of the journal, substantially as described.

In testimony whereof I affix my signature in presence of two witnesses.

ROBERT W. TRAYLOR.

Witnesses:
C. A. NEALE,
E. T. WALKER.